INVENTOR.
LAWRENCE L. SAUNDERS

United States Patent Office 3,510,361
Patented May 5, 1970

3,510,361
BATTERY ACTIVATOR AND VENTING SYSTEM
Lawrence L. Saunders, Denver, Colo., assignor to Whittaker Corporation, Los Angeles, Calif., a corporation of California
Filed Oct. 9, 1967, Ser. No. 673,787
Int. Cl. H01m 11/00; B67d 5/42
U.S. Cl. 136—162                                    11 Claims

ABSTRACT OF THE DISCLOSURE

The gas operated battery actuator stores activator fluid or electrolyte within a cylindrical container to be expelled into the battery prior to use. Upon actuation, gas pressure generated behind a piston forces it forward to expel a given quantity of activator fluid from the front end of the storage cylinder into a manifold to fill the battery cells. A fluid conduit connects an outlet on the battery manofold to the rear of the cylinder through a valve that remains closed to prevent flow until the desired quantity of activator fluid has been expelled. At that time, a vent on the actuator opens to ambient pressure to release the gas pressure in the empty cylinder behind the piston, and the valve opens allowing compressed gases and excess activator fluid to flow from the battery manifold outlet into the empty cylinder. Thereafter, the valve opens whenever needed to vent any gas generated within the battery or activator fluid expelled during battery discharge, thus maintaining the battery interior pressure as desired. The activator fluid expelled flows into and is retained within the cylinder which now serves as a sump, and gases are released through the cylinder and the open vent to the surrounding atmosphere.

BACKGROUND OF THE INVENTION

This invention relates to the field of automatically activated electrical storage batteries and the like, and more particularly to systems for automatically adding activator fluid to batteries and establishing acceptable pressure levels within batteries consistent with safety and good performance.

Wet cell batteries tend to deteriorate prior to use once the electrolyte or other activator fluid is present within the cells. Such batteries are best preserved over extensive periods prior to use by maintaining the cells in a sealed condition without the electrolyte present. The battery may then be activated just before use by simply adding the activator fluid.

In situations where the battery may be inaccessible for manual filling, such as in spacecraft and missiles, the activator fluid must be added automatically by remote control. Typically, automatic activator systems are actuated upon receipt of an electrical control signal to expel the activator fluid under pressure from a storage container into a battery manifold to fill the individual cells. Since the battery case is usually sealed to prevent leakage and spilling of the corrosive electrolyte, pressures are created within the battery during filling. In addition, the chemical reactions and current flows during battery discharge produce additional gas and heat that may increase interior pressures and expel electrolyte from the cells due to thermal expansion. High pressures within a battery can be potentially dangerous and are generally inconsistent with good cell performance. Therefore, unless a battery be specially designed to withstand such pressures, which would involve a considerable increase in weight, size and expense, the interior pressures created during filling and subsequent discharge and excess electrolyte must be released through an appropriate venting system.

Previous automatic activator systems have employed an aspirator tube and sump arrangement for venting the battery manifold to ambient temperature. In such prior arrangements, the aspirator tube was connected directly from the battery manifold to a separate sump, usually located within or on the battery itself, and vented directly to atmospheric pressure. Since the manifold is normally full of activator fluid during filling, some of the fluid is drained off through the open aspirator tube during the filling process. With large batteries, where the aspirator tube has a relatively large diameter to handle the substantial quantities of gas and excess electrolyte expelled during discharge, a substantial quantity of activator fluid might be drained off into the sump during the filling operation before ever entering the cells. Additional electrolyte was therefore required to ensure that the battery cells were filled in spite of this drainage, and the sump had to have additional capacity to handle both this initial drainage and the fluid subsequently expelled during discharge. The additional electrolyte and storage capacity required to offset initial drainage in such systems is inconsistent with the severe space and weight limitations existing in most missile and spacecraft application where such systems were most frequently employed.

SUMMARY

The preferred embodiment of the activator and venting system of this invention employs a gas operated activator in which gas pressure, generated in response to an electrical control signal, forces a piston forward in a storage cylinder containing the activator fluid to expel it under pressure into the battery manifold. A vent conduit coupling the cylinder interior at the back of the piston to ambient pressure is maintained closed, preferably by a frangible diaphragm seal, to maintain the activating gas pressure behind the piston until the desired quantity of fluid has been expelled. Another conduit connects an outlet on the battery manifold to the cylinder interior at the back side of the piston through a check valve that permits flow only from the manifold to the cylinder. During activation, the check valve is held closed by the activating gas pressure. When the piston has been forced forward enough to expel substantially all of the activating fluid from the storage cylinder, the vent passage is opened to discharge the pressurized activating gas from the cylinder at the back side of the piston. Preferably the frangible diaphragm sealing the vent passage is disposed at the front of the cylinder and is arranged to be broken by a puncturing rod that is driven forward by the piston itself as it reaches the front of the cylinder. When the pressurized activating gas is released from behind the piston through the punctured diaphragm, the pressure drop on the cylinder side of the check valve opens it to permit flow of pressurized gas and excess electrolyte from the battery manifold to the now empty cylinder interior behind the piston. Gases and excess electrolyte subsequently expelled during battery discharge also pass through the check valve and into the empty cylinder behind the piston. Gases generated are vented from the cylinder to the surrounding atmosphere, and the excess electrolyte expelled remains within the actuator cylinder which serves as a sump. Thus, the pressure and electrolyte levels within the battery cells are maintained at a level consistent with good performance, and the space and weight required for the battery and its activator system are minimized.

DESCRIPTION OF THE PREFERRED EMBODIMENT

Figure 1:
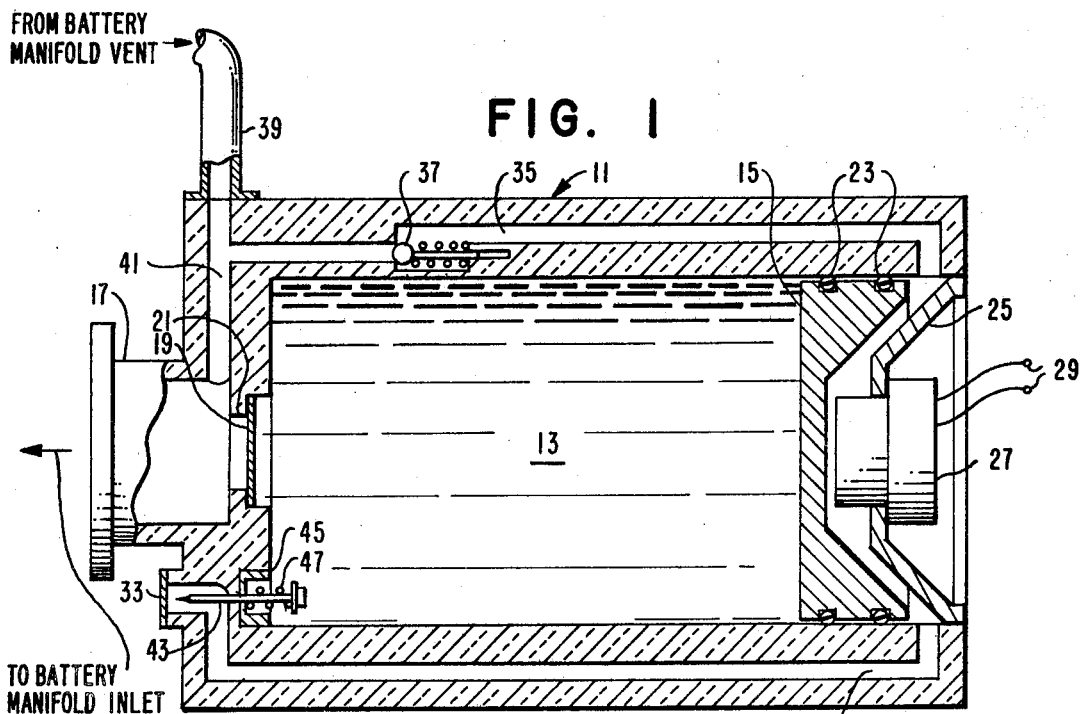
FIG. 1 is a top sectional view of a preferred embodiment of a battery activator and venting system in accordance with this invention shown in its unoperated condition prior to activation.

Referring to FIG. 1, which shows the system in the unactivated position, a storage cylinder 11 contains a desired quantity of battery electrolyte or other activator fluid 13 within its hollow cylindrical interior in front of a movable piston 15. The sealed front wall of the cylinder 11 contains an outlet fitting 17 that is connected either directly to an inlet fitting on the battery manifold (not shown) or indirectly through an appropriate tube connector. A pressure sensitive frangible diaphragm 19 formed of a suitable brazed metal seals an outlet aperture 21 extending through the front wall between the fitting 17 and the cylinder interior to keep the activator fluid confined within the cylinder prior to actuation. The piston 15 has O-rings 23 disposed in grooves around its periphery to provide a pressure seal between the activator fluid and the empty cylinder volume in back of the piston. A closure member 25 pressure seals the back end of the cylinder 11, and a conventional gas generator device 27 is mounted at its center.

The gas generator 27 typically receives an actuating control signal in the form of an electrical impulse on the attached electrical connectors 29. The signal causes the gas generator 27, which is generally pyrotechnic in nature, to begin generating pressurizing gas in the space within the cylinder behind the piston 15. As the pressure behind the piston 15 increases, it is forced forward in the cylinder to exert increasing pressure on the activator fluid 13 confined in front. The liquid pressure of the activator fluid 13 on the frangible diaphragm 19 continues to increase until its yield point is reached. When the diaphragm 19 breaks, the activator fluid 13 flows out of the cylinder interior through the aperture 21 and the outlet fitting 17 to the battery manifold, which distributes the fluid into each of the individual battery cells to activate the battery. As generation of pressurizing gas continues, the piston 15 continues to move forward until the entire volume of activator fluid 13 is forced out through the opening 21 at the forward end of the cylinder.

In accordance with this invention, a vent conduit 31 extends through the body of the cylinder 11 to couple the cylinder interior behind the piston 15 to the surrounding atmospheric or ambient pressure. With the gas operated activator, this passage is initially sealed, in this case by a diaphragm 33 located at the front of the cylinder, to prevent the escape of the pressurized activating gas from behind the piston. Another conduit 35 formed in the cylinder body extends from the cylinder interior behind the piston 15 to be connected to an appropriate outlet fitting on the battery manifold. The manifold outlet is preferably downstream from the manifold inlet to which the actuator outlet fitting 17 is attached. In this case, the connection of the remote manifold outlet to the conduit 35 is made by a short length of connector tubing 39. In addition, a conduit 41 extends from the interior of the actuator outlet fitting 17 adjacent the opening 21 to the conduit 35 to provide a pressure release path at the inlet end of the manifold.

In the preferred embodiment shown herein, a puncturing rod 43 extends through the front wall of the cylinder 11 with its sharp puncturing tip adjacent the vent sealing diaphragm 33 and its head extending a short distance into the cylinder interior. An appropriate bearing assembly 45 maintains a pressure seal around the rod shaft to prevent leakage of the pressurized electrolyte 13 during activation. As shown, the interior front wall of the cylinder may be recessed to permit the use of a biasing spring 47 to insure that the tip of the puncturing rod 43 is normally urged out of contact with the diaphragm 33. Alternatively, a suitable vent passage from the cylinder behind the piston and the conduit 35 may be opened by various means, such as by pyrotechnic devices, so long as the operations are properly coordinated with piston position. However, since timing may be critical, the simple mechanical arrangement illustrated herein is preferred.

The check valve 37 may be spring loaded or otherwise designed to open only when the pressure on the battery side exceeds the pressure from the cylinder behind the piston 15 by a predetermined amount, in most cases about two pounds per square inch, to insure positive closure before and during the filling operation. However, even without a spring bias, the valve 37 is held closed due to the pressure drop across the valve during the time that the pressurized gases from the generator 27 are moving the piston 15 forward to expel the activator fluid 13 into the battery manifold.

Figure 2:
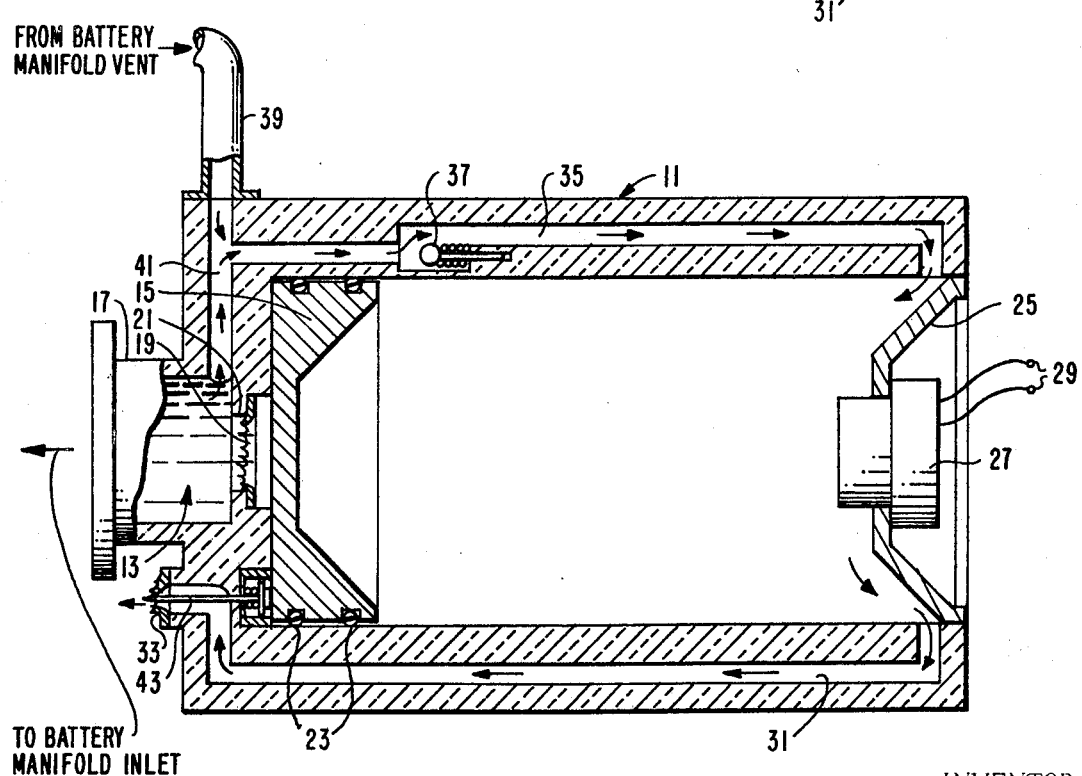
FIG. 2 is a sectional top view of the system of FIG. 1 shown in its fully operated condition.

Referring now to FIG. 2, which shows the piston in the fully operated condition, the diaphragm 19 across the aperture 21 at the front end of the cylinder is ruptured by the fluid pressure resulting from actuation of the gas generator 27. After this, the activator fluid 13 within the cylinder flows through the outlet aperture 21 and the activator outlet fitting 17 to the battery manifold inlet where it is distributed into the individual cells to activate the battery. The gas pressure being generated behind the piston 15 moves it steadily forward until substantially the entire quantity of activator fluid 13 is expelled from the cylinder 11. As the last of the activator fluid is expelled, the front surface of the piston 15 approaches the front interior wall of the cylinder to contact the head of the puncturing rod 43. Further movement of the piston 15 forces the puncturing rod 43 forward, compressing the spring 47 to pierce its sharp tip through the diaphragm 43. As the rod tip punctures the diaphragm 33, the vent conduit 31 is opened to atmospheric or ambient pressure, so that the high gas pressure within the now empty cylinder interior behind the piston 15 is released. As the pressure drops behind the piston 15, the pressure differential created across the check valve 37 opens it to permit gases and excess fluid from the battery manifold outlet to flow through the conduit 35 into the cylinder space behind the piston. Pressurized gas within the battery manifold is vented through the connecting tube 39 and the conduit 35 into the cylinder interior and then out through the vent conduit 31 to the atmosphere. Likewise, excess electrolyte flows through the connecting tube 39 and the conduit 41 into the conduit 35 where it is retained in the now empty interior of the cylinder behind the piston 15 which serves as the sump. The check valve 37 remains open until the pressure within the battery drops to the desired level at or slightly above ambient. Any additional gas generated by the battery operation during discharge is released through the check valve 37 and is vented to atmosphere, and electrolyte expelled due to heating during discharge flows into the cylinder.

Accordingly, the invention provides a relatively simple system which operates to vent the high pressure within the battery only after substantially all of the activator fluid or electrolyte has been introduced into the battery cells so that no drainage through the venting system during filling as in the previous systems. Once the venting operation has been initiated, the pressure within the battery cells is reduced to a level slightly above ambient and this pressure is maintained substantially constant throughout the period of battery operation as gas generated by battery discharge is vented to the atmosphere and electrolyte expelled from the battery is retained within the cylinder 11. This system permits a substantial reduction in the space and weight requirements for an automatic battery activator arrangement by eliminating the necessity for excess electrolyte and storage space to compensate for drainage through the vent system during filling and by also eliminating the need for a separate sump system to store electrolyte drained or expelled from the battery. Although this invention is particularly suited for activating relatively large multicell batteries, such a system is generally applicable to smaller or even single cell batteries, and in various other applications not related to batteries where a given quantity of liquid is introduced under pressure to another container that should thereafter be maintained at or near ambient.

While a preferred embodiment has been described and illlustrated herein to explain the nature of the invention, it should be understood that the invention is not limited to the details shown herein, but includes any and all modifications, alterations and equivalent arrangements falling within the scope of the appended claims.

What is claimed is:

1. An activator and venting system for automatically adding a predetermined quantity of fluid to a sealed container comprising:
   a pressure tight cylinder for confining said predetermined quantity of fluid;
   outlet means including closure means at one end of said cylinder for confining the fluid volume therein until an activating pressure is applied to said fluid and for providing a passage for conducting fluid discharged from said cylinder to said container when an activating pressure is applied;
   a movable piston initially disposed within said cylinder toward the other end to confine said predetermined quantity of fluid between said outlet means and said piston;
   pressure generating means for urging said piston towards said one end of said cylinder to exert an activating presure on said fluid to open said closure means and for moving said piston toward said one end to discharge said fluid to said container;
   vent means for maintaining said other end of the cylinder at an ambient pressure after said predetermined quantity of fluid has been discharged;
   a conduit defining a fluid passage from said container to said other end of the cylinder; and
   valve means disposed within said conduit for preventing fluid passage through said conduit during movement of said piston until said predetermined quantity of fluid has been discharged from said other end of the cylinder into said container.

2. The activator and venting system of claim 1 wherein:
   said pressure generating means constitutes a signal actuated gas generator for pressurizing said other end of the cylinder for moving the piston towards said one end; and
   said vent means includes a vent conduit and means for maintaining said vent conduit closed until said predetermined quantity of fluid has been discharged.

3. The activator and venting system of claim 2 wherein:
   said means for maintaining said vent conduit closed includes means disposed at said one end of the cylinder responsive to the movement of the piston for opening said vent conduit to ambient pressure when the piston reaches said one end of the cylinder.

4. The activator and venting system of claim 3 wherein:
   said means for maintaining said vent conduit closed further includes a frangible diaphragm sealing said vent conduit; and
   said opening means includes an elongated puncturing rod extending through said one end of the cylinder with a head portion disposed within the cylinder to be contacted by the piston in approaching said one end and a tip portion disposed adjacent said frangible diaphragm, said puncturing rod being moved longitudinally by the piston to puncture the frangible diaphragm to permit the release of pressurizing gas from the cylinder to ambient pressure through the punctured diaphragm.

5. The activator and venting system of claim 4 wherein:
   said outlet means further includes an outlet aperture at said one end of the cylinder; and
   said closure means consists of a pressure sensitive diapragm for sealing said outlet aperture and being broken upon application of said activating pressure to permit the discharge of fluid through said outlet aperture.

6. The activator and venting system of claim 5 wherein:
   said valve means constitutes a check valve for permitting fluid flow within said conduit only in a direction from said manifold to said other end of said cylinder.

7. The activator and venting system in accordance with claim 5 wherein:
   said valve means constitutes a check valve disposed within said conduit to prevent fluid passage through said conduit from said other end of the cylinder into said container and for permitting flow through said conduit from said container into said other end of the cylinder when the pressure within said container exceeds the pressure within said other end of the cylinder.

8. An activator and venting system in accordance with claim 1 for automatically adding a predetermined quantity of liquid electrolyte to a sealed battery through a manifold wherein:
   said pressure tight cylinder contains a predetermined quantity of said electrolyte;
   said outlet means is coupled to the inlet of said manifold; and
   said conduit defines a fluid passage between said other end of the cylinder and said manifold at a point located downstream in the direction of electrolyte flow from the manifold inlet.

9. An activator and venting system for automatically adding activator fluid through a battery manifold comprising:
   a cylinder for confining a predetermined quantity of activator fluid, said cylinder having pressure tight front and rear closures;
   outlet means for providing a passage for conducting said activator fluid under pressure through the front closure of said cylinder to the manifold inlet;
   a movable piston disposed within said cylinder to define front and rear cylinder volumes, said piston being initially disposed toward the rear of said cylinder to confine said predetermined volume of activator fluid ahead of said piston;
   pressure generating means for pressurizing said rear cylinder volume upon actuation to move said piston forward to expel the actuator fluid through said outlet means to said battery manifold;
   vent means responsive to the forward movement of said piston produced by actuation of said generator means for releasing the pressurization from the rear cylinder volume behind said piston only after said given volume of actuator fluid is expelled, said vent means defining a substantially unrestricted passage to ambient pressure;
   a fluid conduit connecting said rear volume behind said piston to said battery manifold; and
   check valve means disposed within said fluid passage for permitting fluid flow only from said manifold to said cylinder when the pressure at said manifold is greater than the pressure within the rear cylinder volume.

10. The system of claim 9 wherein:

said pressure generating means constitutes a pyrotechnic gas generating device mounted at the rear of said cylinder behind said piston.

11. The system of claim 9 wherein:

said vent means includes a vent passage connecting the rear of said cylinder behind said piston to ambient pressure, means for normally sealing said vent conduit during movement of said piston, and opening means responsive to the movement of said piston to the front of said cylinder for opening said closure means to permit the escape of pressurizing gas through said vent conduit to ambient pressure.

References Cited

UNITED STATES PATENTS 2,810,776  10/1957  Brill et al.
3,257,241   6/1966  Tamminen.

WINSTON A. DOUGLAS, Primary Examiner

H. SKAPARS, Assistant Examiner

U.S. Cl. X.R.

136—90; 137—260; 141—302; 222—389